United States Patent
Sequeira

[15] 3,686,365
[45] Aug. 22, 1972

[54] BLOCK COPOLYMER COMPOSITIONS
[72] Inventor: Robert M. Sequeira, 1007 Radcliffe Dr., Davis, Calif. 95616
[22] Filed: Nov. 16, 1970
[21] Appl. No.: 90,121

[52] U.S. Cl.........260/876 B, 260/33.6 A, 260/880 B
[51] Int. Cl..........................C08f 29/12, C08f 33/08
[58] Field of Search.......................260/876 B, 880 B

[56] References Cited

UNITED STATES PATENTS 3,322,856   5/1967   Holden et al. ............260/876
3,431,323   3/1969   Jones........................260/880

FOREIGN PATENTS OR APPLICATIONS 1,020,720   2/1966   Great Britain.............260/880

*Primary Examiner*—Samuel H. Blech
*Attorney*—Martin S. Baer and William H. Myers

[57] ABSTRACT

Polymeric compositions having improved environmental resistance comprising a. about 80 to 90 percent of block copolymers having at least two mono alpha alkenyl arene polymer blocks and at least one conjugated diene polymer block and b. about 20 to 1 percent of a selectively hydrogenated block copolymer having, prior to hydrogenation, at least one mono alpha alkenyl arene polymer block and at least one conjugated diene polymer block, said block copolymer having been selectively hydrogenated to saturate at least 80 percent of the olefinic double bonds and 0 to 25 percent of the aromatic double bonds. The compositions are thermoplastic elastomers.

9 Claims, No Drawings

BLOCK COPOLYMER COMPOSITIONS

BACKGROUND OF THE INVENTION

This invention is concerned with polymeric compositions that are intimate mixtures of a major amount of an unsaturated block copolymer with a minor amount of selectively hydrogenated block copolymer that imparts improved environmental resistance.

Block copolymers are acquiring increased importance today in the manufacture of a wide variety of useful products. One typical class of block copolymers that has been developed has the structure A—B—(B—A)$_n$, wherein n is an integer from 1 to 5, and wherein the A blocks are mono alpha alkenyl arene polymer blocks and the B blocks are conjugated diene polymer blocks.

The art of preparing these polymers is well known from many publications, of which U.S. Pats. Nos. 3,231,635; 3,281,383; and 3,301,840 are illustrative. The usual technique is to produce separate, adjacent blocks in a high molecular weight polymer by successively polymerizing monomers in an organo lithium activated system. A typical polymeric product from such reaction is poly(alpha methyl styrene)-polybutadiene-poly(alpha methyl styrene).

These polymers are not ordinarily vulcanized, since they have high strength and other valuable properties resulting from what is usually regarded as a domain structure, and are often described as "self-curing." The domain theory postulates that the blocks A and B, such as the mono alpha alkenyl arene polymer blocks and the diene polymer blocks are structurally quite different and are therefore thermodynamically immiscible; as a result, the two types of blocks separate into two phases, even at high temperatures. The embedded mono alpha alkenyl arene polymer phase provides the strength, reinforcement and cross-linking and the continuous diene polymer phase provides the elasticity, according to this theory.

Also, in an important subgroup of these block copolymers the olefinic double bonds in the diene polymer blocks are converted to saturated hydrocarbon units by selective hydrogenation of the preformed block copolymer. The object of the hydrogenation is to improve the environmental resistance of the olefinically unsaturated block copolymer, particularly its resistance to light, oxygen, ozone, heat and creep under load.

The set of properties in the block copolymer depends on a number of factors, among them the chemical identity of the polymer blocks, individual block molecular weights, the ratio of molecular weights of the different species of blocks, the total molecular weight, and other factors. By careful selection among these factors, the whole set of products from highly elastic to highly plastic materials may be prepared. According to the prior art, a simple structure such as A—B—A, or a more complex one such as A—B—(B—A)$_n$ produced by coupling, where each A is a mono alpha alkenyl arene polymer block and each B is conjugated diene polymer block, will have elastomeric properties and also be thermoplastic if the A polymer blocks constitute less than about 55 percent of the entire weight of the polymer molecule.

However, the unsaturated species of these block polymers have poor resistance to various environmental factors unless they are protected by antioxidants and antiozonants. Even with the best of these additives, the olefinic double bonds in the block copolymers have only modest resistance to such factors as oxygen and ozone, and then only for relatively short periods. Improved additives are required for successful commercial application of the unsaturated block copolymers in many applications; this invention is concerned with such an improvement.

OBJECTS OF THE INVENTION

It is an object of this invention to provide improved block copolymer compositions. It is a specific object of this invention to provide polymeric compositions comprising intimate blends of a major amount of an unsaturated block copolymer with a minor amount of a selectively hydrogenated block copolymer that imparts improved resistance to environmental factors, particularly atmospheric factors such as ozone and oxygen. Other objects will become apparent during the following detailed description of the invention.

STATEMENT OF THE INVENTION

Now, in accordance with the present invention, improved polymeric compositions are provided comprising 1. about 80 percent to 99 percent of a block copolymer having at least two mono alpha alkenyl arene polymer blocks and at least one conjugated diene polymer block and 2. 1 percent to about 20 percent of a selectively hydrogenated block copolymer having, prior to hydrogenation, at least one mono alpha alkenyl arene polymer block and at least one conjugated diene polymer block, said block copolymer having been selectively hydrogenated to remove at least 80 percent of the olefinic double bonds and 0 percent to about 25 percent of the aromatic double bonds.

These compositions have improved resistance to environmental factors, such as ozone and oxygen, without great diminution in tensile strength and other properties, yet the compositions have satisfactory properties for melt processing. The compositions contain a major amount of a block copolymer that has the olefinic unsaturation of the conjugated diene polymer block and a minor amount of a second block copolymer in which more than 80 percent, preferably more than 90 percent, of the olefinic unsaturation has been removed by selective hydrogenation. The non-elastomeric polymer blocks of both types of block copolymers are made from mono alpha alkenyl arenes, preferably from the same monomers, to secure the benefits of such similarity and ease of dispersion on properties.

The precise structure of the unsaturated block copolymers used in the compositions of this invention is not critical and may be varied to suit particular utilities or environments as desired. They may have linear or branched arrangements of alternating A and B blocks.

The most simple linear configuration may be represented as A—B—A. Linear and branched block copolymers having more than three blocks also are contemplated. One type of such polymers may be represented by the general formula A—(B—A)$_{2-5}$. This includes both branched and linear species which have +(B—A) units directly attached (by coupling or block polymerization) to an A block, as in the structures

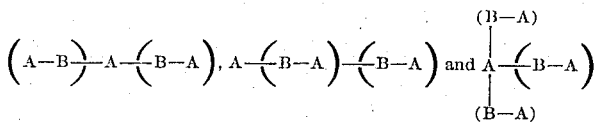

Another general formula which is contemplated includes branched alternatives in which the repeating units (B—A) are directly attached to a B block. These may be represented as A—B—(B—A)$_{2\text{-}5}$.

This includes species such as

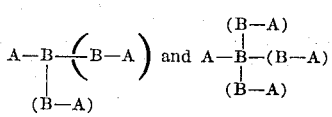

Other structures within the generic scope of the block polymer concept are A—A(B)$_{3\text{-}5}$ wherein each B block is directly attached to an A block, and (A)$_{3\text{-}5}$—B wherein each A block is directly attached to a B block. Suitable alternatives of these types are

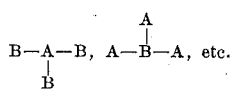

Other alternative configurations can be synthesized, such as a branched configuration on both ends of a linear chain, i.e.,

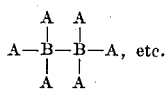

adjacent substantially identical blocks, e.g., —B—B— being regarded as a single block when reference is made to block molecular weights.

It will be understood that these general formulae for the precursor block copolymer have been written to include either sequentially formed species or species that have been formed, at least in part, by the use of coupling agents. In the latter instance, any residue of the coupling agents has been ignored as being an insignificant part of this general formula for high molecular weight polymers.

Typical mono alpha alkenyl arene A polymer blocks may be prepared from styrene, ring alkylated styrenes, alpha alkyl styrenes, alpha, alpha dialkyl styrenes, vinyl naphthalenes and the like, or mixtures thereof. Styrene and alpha methyl styrene are preferred monomers. These monomers may contain minor proportions, based on the mono alpha alkenyl arene, of copolymerizable monomers that have conjugated double bonds, such as conjugated dienes, vinyl pyridines and the like.

Typical conjugated dienes that may be used to form B polymer blocks are butadiene, alkyl substituted butadienes such as isoprene or 2,3-dimethyl butadiene, methyl pentadiene (piperylene) and the like, or mixtures thereof. The $\alpha$, $w$ conjugated butadienes are preferred. Also, the B polymer blocks may be copolymers prepared from mixtures of conjugated dienes with minor proportions of alkenyl aromatic hydrocarbons and still be useful in the practice of this invention. A preferred species of such a copolymer B block comprises a styrene-butadiene copolymer block.

The average molecular weight of each A polymer block in the olefinically unsaturated block copolymers useful in this invention may be from about 7,000 to about 45,000; preferably the average molecular weight range should be between about 10,000 and 30,000. The B polymer blocks may have average molecular weights from about 10,000 to about 135,000, but preferably should be between about 20,000 and about 80,000. The proportion of A blocks may be from about 5 percent by weight to about 70 percent by weight of the total weight of the block copolymer, but preferably should be from about 10 percent by weight to about 60 percent by weight. The properties of the block copolymers will range from highly elastomeric rubbers at low A polymer block percentages to slow recovering elastomers or even products with plastic character at high A polymer block content.

Selectively hydrogenated block copolymers suitable for blending in minor amounts with the above unsaturated block copolymers will have, prior to hydrogenation, the general types of formulas and also two-block structures A—B, all wherein the A and B polymer blocks are defined in the same way as in the formula shown above for the unsaturated block copolymers.

Typical mono alpha alkenyl arenes A polymer blocks and typical conjugated diene B polymer blocks in the precursors of the selectively hydrogenated block copolymers may be prepared from the monomers described above as typical for the corresponding A and B blocks of the unsaturated block copolymers. It is desirable that the A polymer blocks of the unsaturated block copolymer and of the precursor of the selectively hydrogenated block copolymer be made from the same monomer; such matching of mono alpha alkenyl arene polymer blocks provides the best compatibility between the two kinds of polymers and is believed to provide "phase anchoring" by the hypothesis described below.

The average molecular weight of the A polymer blocks in the selectively hydrogenated block copolymers may be from about 3,000 to about 40,000, but preferably should be from about 8,000 to about 30,000. The B polymer blocks may have average molecular weights from about 10,000 to about 120,000, but preferably between about 20,000 and about 80,000. The proportion of A blocks may be from about 5 percent to about 70 percent of the total molecular weight, but preferably between about 10 percent by weight and about 50 percent by weight.

Solution polymerization by techniques known to the prior art is preferred to make the precursor block copolymers, using lithium based catalysts that may be monofunctional, for example, lithium alkyls, or polyfunctional, for example, dilithionaphthalene or the addition product of secondary butyl lithium and 1,3-divinyl benezene. The monomers are dissolved in inert solvents. Anaerobic conditions are essential, and reactive impurities must be removed from both the highly purified monomers and the solvents by scavenging the impurities with very carefully measured quantities of the polymerizing initiator. For example, a solution of purified styrene in dry cyclohexane is treated with small amounts of lithium alkyl to the point of incipient polymerization to remove impurities, after which a quantity of lithium alkyl, such as secondary butyl lithium, is added that is sufficient to cause polymerization to a polymer block of appropriate molecular weight. A second monomer, such as butadiene, and later a third monomer, if desired, may be added to form subsequent polymer blocks, being careful in each instance that the previous monomer is consumed by polymerization or any excess is removed.

In this way a two-block polymer A-B may be formed (or a three-block polymer A—B—A if a dilithio initiator is employed) and used as is, or coupled or made into a three-block polymer with more monomer, all within the scope of this invention. The A—B—Li living two-block polymer may be coupled with a dihaloethane to form a linear A—B—B—A structure, or it may be joined in a multiple way to form a star-shaped, radial, branched or non-linear structure (depending on the nomenclature desired) using a polyfunctional coupling agent such as silicon tetrahalide, diesters of dicarboxylic acids and monohydric alcohols like diethyl adipate and other coupling agents known to the art.

The precursor block copolymer to be added in minor amounts to form the compositions of this invention must be selectively hydrogenated under conditions chosen so that at least 80 percent of the olefinic double bonds in the conjugated diene polymer block will be saturated and the mono alpha alkenyl arene polymer blocks will not be hydrogenated to any substantial extent. Hydrogenation is preferably done by dissolving the precursor block copolymer in an inert solvent, usually the polymerization solvent, adding a cobalt, nickel or iron carboxylate or alkoxide that has been reduced with an aluminum alkyl compound, and pressuring with hydrogen to between 50 psig and 500 psig at mild temperatures of 20° to 50°C. The selective hydrogenation proceeds to the extent desired in about 0.1 to 1 hour.

The product from hydrogenation may be examined for remaining olefinic unsaturation by infrared analysis and by determination of iodine number. The infrared absorbances at wave lengths of 10.05, 10.35, 10.98 and 13.60 microns are indicative of the remaining olefinic unsaturation in the conjugated diene polymer blocks. It is preferred that those absorbances be low. The iodine number of the block copolymer is reduced by hydrogenation from about 200–400 down to the order of 0–50 by selective hydrogenation; it is preferred that the iodine number be below about 10. The iodine number here refers to the usual fat analysis method, and the units are reported in grams of iodine per 100 grams of block copolymer. The double bonds in the aromatic rings of the mono alpha alkenyl arene polymer blocks of the block copolymer do not add iodine in this analytical method, so that only the olefinic unsaturation in the diene polymer blocks is counted. The iodine number of the precursor block copolymer depends on the ratio of the weights of the conjugated diene polymer block to the mono alpha alkenyl arene polymer block, but in the products of most utility the iodine numbers before and after hydrogenation fall in ranges quoted above. Extent of hydrogenation of the aromatic rings may be determined by ultraviolet absorption methods known to the art.

The hydrogenation may not be completely selective and some of the aromatic double bonds may be hydrogenated under the conditions noted above. Such an event may occur with particular catalysts, or with unusual samples of a catalyst that is normally very selective. Hydrogenation of up to about 25 percent of the aromatic double bonds in the block copolymer may occur, despite great care. For this reason, hydrogenated block copolymers wherein the diene polymer blocks are more than 80 percent saturated and wherein the mono alpha alkenyl arene polymer blocks are also saturated to an extent of 0 percent to about 25 percent are within the scope of this invention.

The selectively hydrogenated block copolymers have relatively few olefinic double bonds, or under the preferred conditions no olefinic double bonds at all, to react with atmospheric gases such as ozone or oxygen. The polymer blocks having aromatic rings formed, from the mono alpha alkenyl arenes are resistant to atmospheric gases and also to actinic radiation such as ultraviolet light. Also, these hydrogenated copolymers show significant improved creep and heat resistance. Thus, the selectively hydrogenated polymer is a desirable additive to improve the resistance of an unsaturated block copolymer to environmental factors.

While the following hypothesis is not to be construed in any way as limiting on the present invention, it has been proposed to explain the unusual molecular distribution in the compositions of this invention. When the mono alpha alkenyl arene polymer blocks of the two kinds of block copolymers are identical they are thermodynamically compatible and can enter the same domain, as the "spherical islands" of the embedded phase are often named in the domain theory. The elastomeric polymer blocks of the two kinds of copolymers are unlike, since one of the polymers has been hydrogenated, and they are therefore incompatible with each other as well as with the aggregates of mono alpha alkenyl arene polymer blocks. Together the two types of elastomeric blocks form a heterogeneous matrix, in which the minor component, i.e. the selectively hydrogenated diene polymer blocks, is though to be scattered but nevertheless well-dispersed, possibly as a separate network. Swelling measurements support the assumption that there is no interaction or thermodynamic mixing between the two kinds of elastomeric blocks.

Similarity of the mono alpha alkenyl arene polymer blocks in the two types of block copolymers should permit them to reside in a common domain, and by a "phase anchoring" action should forbid gross demixing or migration of the selectively hydrogenated block copolymer. The similarity is also believed to promote the very good dispersion of one copolymer in the other noted during hot shear mixing and, because of the good dispersion, to secure maximum benefits from relatively small amounts of the minor component. When the two block copolymers have polymer blocks made from different mono alpha alkenyl arene monomers, phase anchoring cannot occur, and dispersion of the minor component through the system must be done by vigorous shear mixing.

The two kinds of block copolymers may be mixed intimately by any of a number of techniques known to the practitioners skilled in the art. Particularly useful procedures are to mix the two ingredients batchwise in a shear mixer, for example, on a two-roll, differential speed mill or in a stationary Banbury machine, or on the run in a continuous shear mixer or shear extruder. In another technique, the two kinds of polymers may be dissolved in a mutual solvent, such as cyclohexane, then recovered by high speed steam coagulation or by adding a non-solvent. Alternatively, the solution may be used without coagulation for coatings, sheet or film casting and the like.

The polymeric compositions of the present invention may be compounded further with oils, fillers, antioxidants, stabilizers, antiblocking agents and other typical rubber and plastics compounding ingredients, as well as with vulcanizing agents, if desired, without departing from the scope of the invention. These additives are often present in commercial products to enhance one or another property, or to reduce costs, to improve processability or for other purposes. Under some circumstances, such as to improve resistance to solvents, vulcanization of the compositions may be valuable.

Elastomeric compositions prepared in accordance with this invention are suitable for most purposes where rubbers are employed, such as in coatings, mechanical goods, latices, paints, thermoformed articles, insulations, etc. The compositions may be injected molded, blow molded, compression molded and extruded. Other molded articles as well as films, sheets, textile coatings and the like may be produced. The compositions may be cast from solvents to form films or spun into fibers or coated on other objects. Plastic molding compositions having the usual plastic end uses may be prepared, particularly when the mono alpha alkenyl arene polymer blocks constitute a high percentage of the weight of the selectively hydrogenated block polymer. Contemplated plastic end uses are moldings, mechanical goods, extruded objects such as pipe, films, sheets, wire coatings, fibers and the like.

The following examples illustrate the manner in which the invention may be carried out. The examples are for the purposes of illustration, and the invention is not to be regarded as limited to any of the specific compounds or polymers or to the conditions recited. Unless otherwise stated, the term phr stands for parts per hundred of polymer.

EXAMPLE 1

The preparation of a polystyrene-polybutadiene-polystyrene block copolymer and the selective hydrogenation of the polybutadiene block are described. Such preparations are not part of the present invention but are illustrations of two of the kinds of block copolymers useful in this invention.

Polymerization

All monomers and solvents were treated to remove water, oxygen and polar materials, and the reaction system was thoroughly purged and blanketed with nitrogen. The reactor was charged with 4,200 g of cyclohexane and 468 g of styrene that had been titrated to scavenge reactive impurities. Then 0.031 mole of secondary butyl lithium in 275 g of cyclohexane was added to start polymerization, which converted essentially all of the styrene to polystyrene in 1 hour at 50°C. A 132 g sample was withdrawn for analysis.

The rest of the living polymer solution was transferred to a second reactor containing 2,160 g of butadiene, 11,535 g of cyclohexane and 50 g of tetrahydrofurane (tetrahydrofurane/lithium ratio 20:1) that had been pretitrated with secondary butyl lithium to incipient polymerization. After 3 hours of further polymerization at 40°C, the butadiene was substantially all consumed to form the second block of the copolymer. A second sample was removed for analysis.

A solution of 442 g of styrene in 2,650 g of cyclohexane, pretitrated with secondary butyl lithium to incipient polymerization, was then charged to the reactor to form the third block of the copolymer. After one hour at 45°C polymerization was complete. A third sample was removed for analysis, and the remainder of the polymer solution was hydrogenated.

Analysis of each of the three samples removed during polymerization 30 by a tritium method indicated the average molecular weights of the three blocks to be 13,000–64,000–15,000. The polybutadiene middle block of this polymer contained 46 percent 1,2 microstructure, using an infrared analysis based on absorbances at the wave lengths described hereinabove.

Selective Hydrogenation

In a typical selective hydrogenation run the polymer solution from the polymerization step was transferred to a hydrogenation autoclave. As catalyst 6 millimoles of nickel acetylacetonate was reacted with 12 millimoles of triethyl aluminum in 1,500 ml of cyclohexane for 15 minutes at 25°C, then added to the system. The autoclave was pressured to 500 psig with hydrogen. The reaction temperature rose to 50°C, and after 25 minutes hydrogenation was stopped. The selectively hydrogenated polymer had an iodine number in the range 10–20 and substantially no remaining olefinic unsaturation.

After recovery by coagulation and drying, and after molding to make typical rubber specimens, the pertinent physical properties of a typical selectively hydrogenated polymer were determined by ASTM rubber techniques. Data were:

| | |
|---|---|
| Tensile strength at break, 23°C, psi | 7,000 |
| 300% modulus, 23°C, psi | 650 |
| Elongation at break, 23°C, % | 590 |
| Set after break, 23°C, % | 20 |

EXAMPLES 2 TO 8

A selectively hydrogenated block copolymer that had, prior to hydrogenation, the structure polystyrene-polybutadiene-polystyrene and average polymer block molecular weights of 14,000–64,000–14,000 was intimately mixed in various percentages into major amounts of a commercial polystyrene-polybutadiene-polystyrene block copolymer having average polymer block molecular weights of 14,000–64,000–14,000. Several other oxygen and ozone stabilizing ingredients that are normally added to the olefinically unsaturated polymer were present, the aggregate amount was 1.6 phr.

The two polymers were mixed on a two-roll laboratory mill at 150°C. Slabs 0.050 inch thick were then molded and exposed to ozone using ASTM method D 1149 that accelerates ozone attack for test purposes. The slabs were bent into the typical bent loop configuration in racks, then placed in an ozone chamber at 50°C in an atmosphere containing 50 parts per hundred million of ozone in air. The specimens were inspected frequently for cracks to establish the rate of ozone attack. The results of the observations are shown in Table 1.

TABLE 1

Crack Growth Rating During Ozone Exposure

| Selectively Hydrogenated ex. Block Copolymer | Crack Rating[a] After 2 hrs | 8 hrs | 12 hrs | 20 hrs | Exposure for 27 hrs | 92 hrs |
|---|---|---|---|---|---|---|
| Added, % | | | | | | |
| 2   0 | 9 | 7 | 6 | 4 | 4 | 0 |
| 3   0.5 | 9 | 8 | 7 | 5 | 5 | 0 |
| 4   1.0 | 9 | 8 | 8 | 5 | 5 | 1 |
| 5   2.0 | 9 | 9 | 8 | 7 | 7 | 3 |
| 6   5.0 | 9 | 8 | 8 | 6 | 6 | 2 |
| 7   10.0 | 9 | 8 | 8 | 6 | 6 | 3 |
| 8   100 | 10 | 10 | 10 | 10 | 10 | 10 |

[a]Visual rating; 10 = no cracks, 0 = sample broken by large cracks.

It is evident that the ozone resistance of the polystyrene-polybutadien-polystyrene was significantly improved by adding even small amounts of the selectively hydrogenated block copolymer. It should be noted that although the control polymer, Example 2, as well as the other test examples were protected with the best combination of antioxidants and antiozonant additives known to the art, the efficacy of those additives was nil after 92 hours.

EXAMPLES 9 TO 14

These examples show the tensile strengths of several blends of minor amounts of a selectively hydrogenated polystyrene-polyisoprene-polystyrene in major amounts of unsaturated polystyrene-polybutadiene-polystyrene polymer. The unsaturated polymer had average block molecular weights of 22,000–108,000–22,000 and the hydrogenated polymer had average block molecular weights of 18,000–88,000–20,000 before hydrogenation. The iodine number indicated that at least about 98 percent of the olefinic double bonds had been saturated.

The block copolymers were mixed intimately by dissolving them in the same solvent and coagulating with steam, then drying by milling on a two-roll mill. Specimens were hot molded and their tensile strengths were determined at 23°C by ASTM rubber techniques.

Tensile strength data are recorded in Table 3. The importance is emphasized again of balancing improvements in environmental resistance provided by the hydrogenated block copolymers with the desired tensile strengths of the compositions, which are intermediate between the values for the two unmodified components.

TABLE 2

Tensile Strength of Block Copolymer Compositions

| ex. | Parts by Weight of unsaturated block copolymer | hydrogenated block copolymer | tensile strength, 23°C psi |
|---|---|---|---|
| 9 | 25 | 75 | 3675 |
| 10 | 50 | 50 | 3300 |
| 11 | 75 | 25 | 2975 |
| 12 | 85 | 15 | 3650 |
| 13 | 95 | 5 | 4000 |
| 14 | 100 | 0 | 4300 |

I CLAIM AS MY INVENTION:

1. A polymeric composition comprising
   a. about 80 to 99 percent by weight of an unsaturated block copolymer having at least two mono alpha alkenyl arene polymer blocks each having an average molecular weight between about 7,000 and 45,000 and at least one conjugated diene polymer block having an average molecular weight between about 10,000 and 135,000 as the sole types of polymer blocks and
   b. 1 to about 20 percent by weight of a selectively hydrogenated block copolymer having, prior to hydrogenation, at least one mono alpha alkenyl arene polymer block having an average molecular weight between about 3,000 and 40,000 and at least one conjugated diene polymer block having an average molecular weight between about 10,000 and 120,000 as the sole types of polymer blocks, said block copolymer being selectively hydrogenated to remove at least 80 percent of the olefinic double bonds and 0 to about 25 percent of the aromatic double bonds.

2. A composition according to claim 1 wherein the selectively hydrogenated block copolymer has, prior to hydrogenation, the general formula $A-B-(B-A)_{0-5}$ wherein each A is a mono alpha arene polymer block and each B is a conjugated diene polymer block.

3. A composition according to claim 1 wherein the selectively hydrogenated block copolymer, prior to hydrogenation, is polystyrene-polybutadiene-polystyrene and the unsaturated block copolymer is polystyrene-polybutadiene.

4. A composition according to claim 1 wherein the selectively hydrogenated block copolymer, prior to hydrogenation, is polystyrene-polyisoprene-polystyrene and the unsaturated block copolymer is polystyrene-polyisoprene.

5. A composition according to claim 1 wherein the selectively hydrogenated block copolymer, prior to hydrogenation, is poly (alpha methyl styrene) -polybutadiene-poly (alpha methyl styrene) and the unsaturated block copolymer is poly (alpha methyl styrene) -polybutadiene.

6. A composition according to claim 1 wherein the selectively hydrogenated block copolymer, prior to hydrogenation, is poly (alpha methyl styrene) -polyisoprene-poly (alpha methyl styrene) and the unsaturated block copolymer is poly (alpha methyl styrene) -polyisoprene.

7. A composition according to claim 1 wherein the unsaturated block copolymer and the selectively hydrogenated block copolymer, prior to hydrogenation, have the structure polystyrene-polybutadiene-polystyrene.

8. A composition according to claim 1 wherein the unsaturated block copolymer and the selectively hydrogenated block copolymer, prior to hydrogenation, have the structure polystyrene-polyisoprene-polystyrene.

9. A composition according to claim 1 wherein the unsaturated block copolymer and the selectively hydrogenated block copolymer, prior to hydrogenation, have the structure poly (alpha methyl styrene) -polybutadiene-poly (alpha methyl styrene).

* * * * *

PO-1050
(5/69)

UNITED STATES PATENT OFFICE
CERTIFICATE OF CORRECTION

Patent No. 3,686,365            Dated    August 22, 1972

Inventor(s) ROBERT M. SEQUEIRA

It is certified that error appears in the above-identified patent and that said Letters Patent are hereby corrected as shown below:

Following the inventor's name and address in the heading of the patent, reference to the assignment has been omitted, which reference should read:

-- [73] Assignee: Shell Oil Company, New York, N.Y. -- .

Signed and sealed this 8th day of May 1973.

(SEAL)
Attest:

EDWARD M. FLETCHER, JR.           ROBERT GOTTSCHALK
Attesting Officer                    Commissioner of Patents